Jan. 10, 1961     J. K. MOREHART     2,967,350
BATTERY LEAD SALVAGING MACHINE
Filed July 25, 1955     2 Sheets-Sheet 1
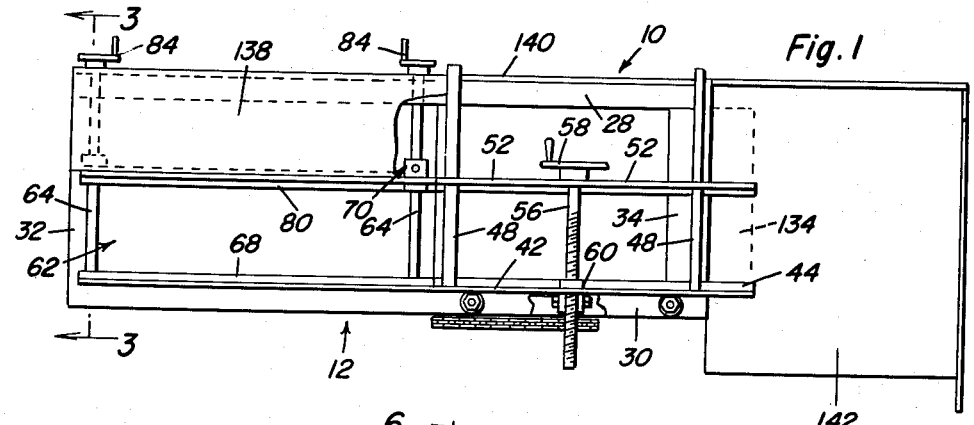
Fig. 1
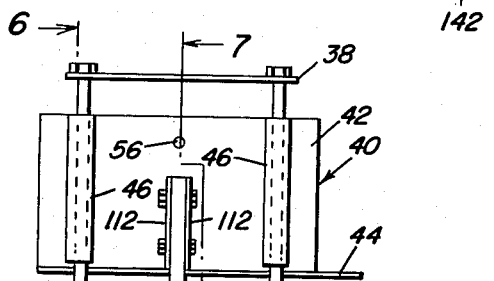
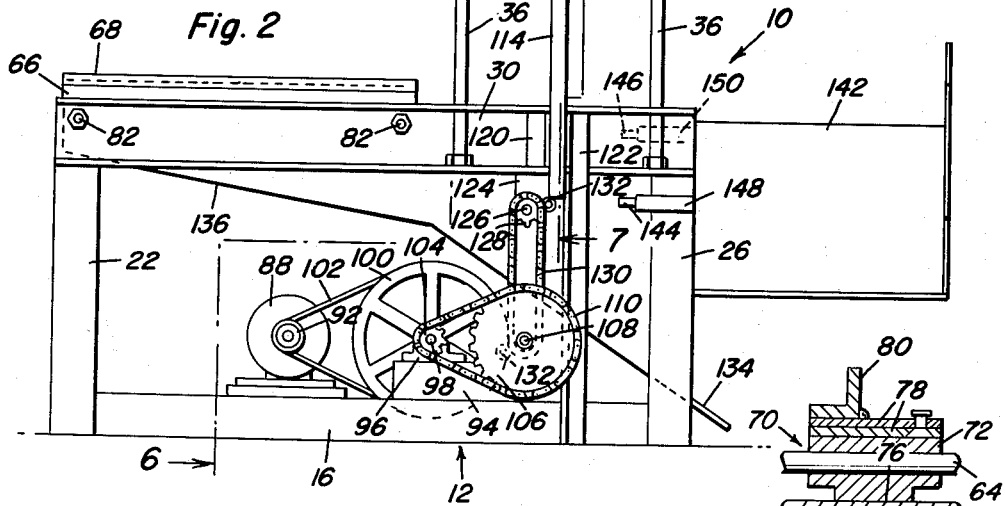
Fig. 2
Fig. 4
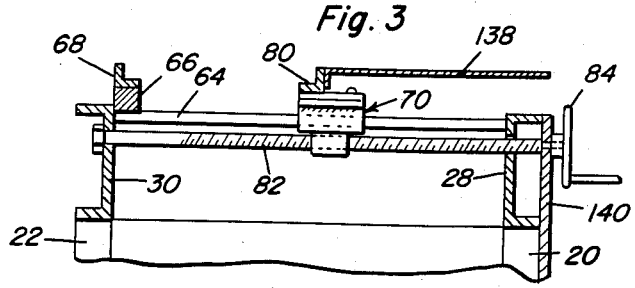
Fig. 3
Jewell K. Morehart
INVENTOR.
BY *Clarence A. O'Brien*
and *Harvey B. Jacobson*
Attorneys Jan. 10, 1961
J. K. MOREHART
2,967,350
BATTERY LEAD SALVAGING MACHINE
Filed July 25, 1955
2 Sheets-Sheet 2
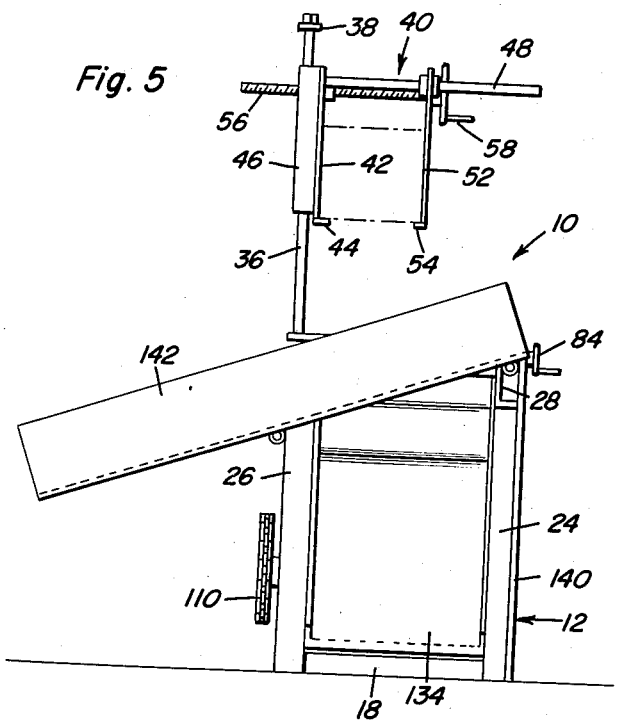
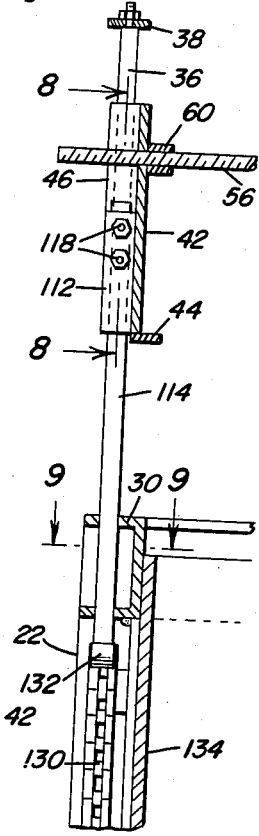
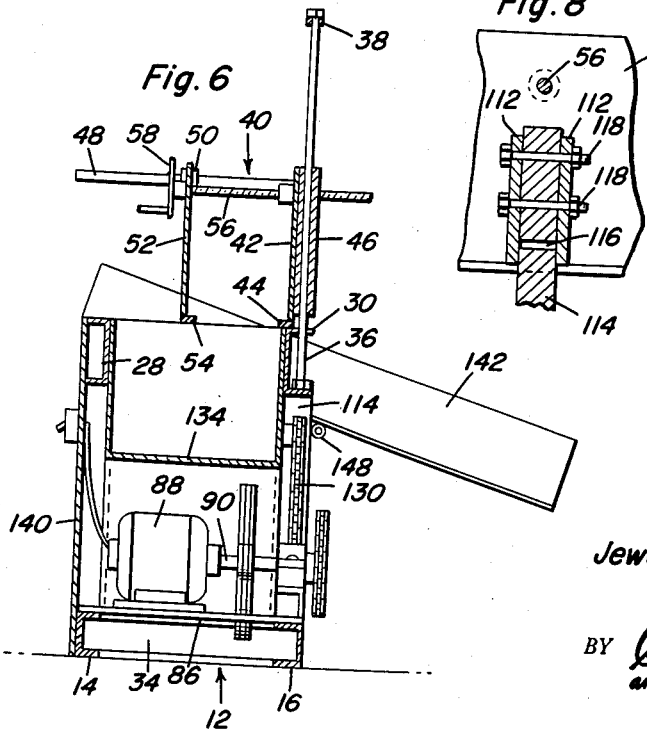
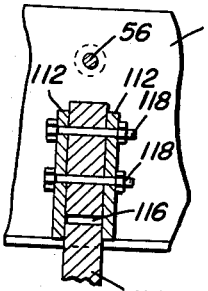
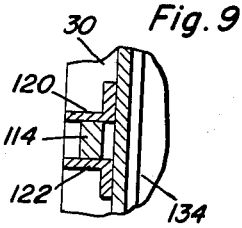
Jewell K. Morehart
INVENTOR.
BY *Clarence A. O'Brien
and Harvey B. Jacobson*
Attorneys

United States Patent Office 2,967,350
Patented Jan. 10, 1961

2,967,350

BATTERY LEAD SALVAGING MACHINE

Jewell K. Morehart, R.F.D. 4, Alva, Okla.

Filed July 25, 1955, Ser. No. 523,992

7 Claims. (Cl. 29—204)

This invention relates in general to new and useful improvements in salvaging machinery, and more specifically to a battery lead salvaging machine.

The average automobile battery and other batteries, when no longer suitable for their intended use, are salvaged in order to reclaim the lead of the plates thereof. Inasmuch as the battery lead is disposed within a battery case, it is necessary that the battery lead be removed from the battery case before it can be reclaimed. The battery lead is normally secured to a top plate which is sealed in the battery case by means of a suitable sealer of the asphalted type. Once this sealer has been broken, the entire top wall of the battery, together with the battery lead, will fall out of the battery case so that the battery lead may be easily reclaimed.

It is therefore the primary object of this invention to provide a battery lead salvaging machine which is so constructed whereby batteries may be dropped in such a manner so that the movement of the battery case will be suddenly stopped and the battery lead will have a tendency to move downwardly out of the battery case, the battery case being held in an inverted position in the battery lead salvaging machine.

Another object of this invention is to provide an improved battery lead salvaging machine which includes a carriage for receiving a plurality of batteries and for alternately raising and dropping said batteries in order to remove the battery lead therefrom, the carriage including a pair of ledges on which the edges of the battery cases of the batteries being reclaimed rest, the battery carriage being provided with a suitable adjustment for varying the spacing of the ledges so that batteries of different widths may be supported in the carriage.

Another object of this invention is to provide an improved battery lead salvaging machine which includes a base provided at one end thereof with a battery guide, there being carried by the base for alternate raising and dropping a carriage, the carriage being aligned with the battery guide when it is in its lowered position so that batteries may be conveniently shoved from the battery guide into the battery carriage, there being disposed on the opposite side of the carriage a battery case chute whereby when batteries are being placed in the battery carriage, the previously emptied battery cases will automatically be forced from the battery carriage and down the battery case chute.

A further object of this invention is to provide an improved mechanism for alternatingly raising and dropping a battery carriage for the purpose of removing battery lead from battery cases, the mechanism including a lift bar secured to the battery carriage, an endless member positioned adjacent the lower part of the lift bar, the endless member being provided with spaced lugs engageable with the lift bar to selectively raise the lift bar and to move out of engagement therewith so that the battery carriage will be free to drop.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the battery lead salvaging machine and shows the general details thereof, a portion of a splash pan being broken away in order to show the details of the adjustable feature of the invention;

Figure 2 is a side elevational view of the battery lead salvaging machine and shows the general details of the mechanism thereof, a battery carried by the machine being shown in an elevated position immediately prior to being dropped;

Figure 3 is an enlarged fragmentary transverse vertical sectional view taken substantially upon the plane indicated by section line 3—3 of Figure 1 and shows the specific details of the mounting of the movable member of a battery guide of the machine;

Figure 4 is an enlarged transverse sectional view through one of the brackets of the battery guide and shows the manner of mounting the same and adjusting the same;

Figure 5 is an end elevational view of the machine as viewed from the right in Figure 1 and shows the details of the battery case chute;

Figure 6 is a transverse vertical sectional view taken substantially upon the plane indicated by the section line 6—6 of Figure 2 and shows further the details of the machine;

Figure 7 is an enlarged fragmentary vertical sectional view taken substantially upon the plane indicated by the section line 7—7 of Figure 2 and shows the specific details of the means for raising and dropping the carriage;

Figure 8 is an enlarged fragmentary vertical sectional view taken substantially upon the plane indicated by the section line 8—8 of Figure 7 and shows the manner in which a lift arm is adjustably secured to the battery carriage; and Figure 9 is an enlarged fragmentary horizontal sectional view taken substantially upon the plane indicated by the section line 9—9 of Figure 7 and shows the details of the guide for the lift bar.

Referring now to the drawings in detail, it will be seen that there is illustrated a battery lead salvaging machine, which is the subject of this invention, the battery lead salvaging machine being referred to in general by the reference numeral 10. The battery lead salvaging machine 10 includes a base which is referred to in general by the reference numeral 12.

The base 12 includes a pair of longitudinally extending, transversely spaced frame rails 14 and 16. The frame rails 14 and 16 are preferably of a channel-shaped cross-section and open towards each other, as is best illustrated in Figure 6. The left hand ends of the frame rails 14 and 16, as viewed in Figure 1, are connected together by a transverse frame member (not shown). The right hand ends of the frame rails 14 and 16 are connected together by a transverse frame member 18.

Extending upwardly from the left hand ends of the frame rails 14 and 16, as viewed in Figure 1, are standards 20 and 22. Extending upwardly from the right hand ends of the frame rails 14 and 16 are standards 24 and 26, respectively. Secured to the upper ends of the standards 20 and 24 and extending therebetween is an upper frame rail 28. A similar upper frame rail 30 extends between the upper ends of the standards 22 and 26. As is best illustrated in Figure 6, the upper frame rails 28 and 30 are of a channel-shaped cross-section and open away from each other. The left hand ends of the upper frame rails 28 are connected together by a transverse frame member 32. The opposite ends of the frame rails 28 and 30 are connected together by a transverse frame member 34.

Referring now to Figures 1 and 2 in particular, it will be seen that there is carried by the frame rail 30 adjacent the right hand end thereof a pair of upstanding guide members 36. The upper ends of the guide members 36 are connected together by a bar 38 to prevent spreading thereof.

Carried by the vertical guide members 36 for vertical movement thereon is a battery carriage which is referred to in general by the reference numeral 40. The battery carriage 40 includes a longitudinally disposed, vertical plate 42 which terminates at its lower end in an inwardly directed ledge 44. Secured to the outer surface of the plate 42 in longitudinally spaced relation are guide sleeves 46. The guide sleeves 46 are received over the guide members 36. The plate 42 is fixed with respect to the base 12 for vertical movement only by the guide members 36.

Extending rearwardly from the plate 42 adjacent the upper corners thereof is a pair of horizontal support rods 48. The support rods 48 have slidably positioned thereon fittings 50 which carry a depending plate 52. The plate 52 is in spaced parallel relation with respect to the plate 42 and forms an opposite side of the battery carriage 40. The plate 52 terminates at its lower end in a ledge 54 which opposes the ledge 44.

In order that the plate 52 may be selectively positioned with respect to the plate 42, there is provided a feed shaft 56. The feed shaft 56 is suitably journaled in the plate 52 and is provided with a hand crank 58 to facilitate rotation thereof. The feed screw 56 has the opposite end portion thereof threadedly engaged in a follower nut member 60 carried by the plate 42. Thus, when the feed screw 56 is turned, the plate 52 will be moved towards or away from the plate 42 to adjust the ledges 44 and 54 to the desired spacing. By so adjusting the spacing between the ledges 44 and 54, the battery carriage 40 may be adapted to receive batteries of different widths.

Carried by the base 12 at the left hand end thereof and in overlying relation thereto is a battery guide which is referred to in general by the reference numeral 62. The battery guide 62 includes a pair of transverse shafts 64 which extend between the upper frame rails 28 and 30, as is best illustrated in Figures 1 and 3. Disposed immediately adjacent the frame rail 30 and overlying the shafts 64 is a longitudinally disposed member 66. Carried by the member 66 is an inwardly opening angle member 68. The angle member 68 extends longitudinally of the base 12 and forms the inside of the battery guide 62.

Carried by each of the shafts 64 is a fitting which is referred to in general by the reference numeral 70. The individual fitting 70 includes an upper sleeve portion 72 in which the associated shaft 64 is guidedly received. The individual fittings 70 also include a depending sleeve portion 74 which includes an internally threaded bore 76. Secured in overlying relation to each fitting 70 is a pair of spacer plates 78. Overlying the spacer plates 78 and extending therebetween is an angle member 80. The angle member 80 is secured to the uppermost spacer plate 78 of each of the fittings 70 and opens towards the angle member 68. The angle members 68 and 80 form the guides for receiving batteries which are intended to have their battery lead salvaged therefrom.

In order that the angle members 68 and 80 may be properly positioned for supporting battery cases of different widths, there is provided in each of the fittings 70 a transversely extending feed screw 82. The feed screw 82 is threadedly engaged in its associated bore 76 and is provided with a feed wheel 84. By rotating the feed wheels 84, the fittings 70 may be transversely adjusted so as to adjust the position of the angle member 80 with respect to the angle member 68.

Referring now to Figures 2 and 6 in particular, it will be seen that there is provided a motor mounting plate 86 which extends between and is secured to the frame rails 14 and 16. Secured on the motor mounting plate 86 is an electric motor 88. The electric motor 88 includes an armature shaft 90 on which there is mounted a drive pulley 92.

Overlying intermediate portions of the frame rails 14 and 16 are elongated spacers 94. Carried by the spacers 94 in transverse alignment are pillow blocks 96 supporting an intermediate shaft 98. The shaft 98 is provided with a relatively large driven pulley 100 disposed in alignment with the drive pulley 92. Entrained over the pulleys 92 and 100 and drivingly connecting them together is a drive belt 102.

The shaft 98 extends outwardly of the confines of the base 12 and has mounted thereon a drive sprocket 104. The drive sprocket 104 is aligned with a relatively large driven sprocket 106 carried by a transverse shaft 108. The shaft 108 will be mounted in the same manner as the intermediate shaft 98. Entrained over the sprockets 104 and 106 is a drive chain 110.

Referring now to Figures 7 and 8 in particular, it will be seen that there is carried by an intermediate portion of the plate 42 on the outer surface thereof a pair of longitudinally spaced, vertically extending mounting plates 112. Disposed between the mounting plates 112 is an upper end of a lift bar 114. The lift bar 114 is provided with a plurality of vertically spaced bores 116 in which there are selectively received fasteners 118 carried by the mounting plates 112. Thus, the lift bar 114 may be adjusted with respect to the plate 42.

Carried by the frame rail 30 between the flanges thereof is a relatively short guide 120. Disposed in spaced relation with respect to the guide 120 is an elongated guide 122 which extends from the upper part of the frame rail 30 down to and is secured to the frame rail 16. The lift bar 114 is disposed between the guides 120 and 122 and guided thereby, as is best illustrated in Figure 9.

Depending from the frame rails 28 and 30 are bearing supports 124. Suitably journaled in the bearing supports 124 is a shaft 126 which is disposed in overlying relation with respect to the shaft 108. Carried by the shaft 126 is a driven sprocket 128 which is in alignment with the drive sprocket (not shown) carried by the shaft 108. Entrained over the driven sprocket 128 and the last mentioned drive sprocket is a drive chain 130.

The drive chain 130 has a portion thereof disposed closely adjacent the lift bar 114. Carried by the drive chain 130 in spaced relation are roller type lugs 132. The lugs 132 are engageable with the lower end of the lift bar 114 to elevate the lift bar 114 and the battery carriage 40. As the battery carriage 40 approaches the top of its travel, the lug 132 will move out from under the lift bar 114 and permit the battery carriage 40 to drop. The sudden stoppage of the battery carriage 14 in its lowermost position will tend to drive the battery lead out of the battery cases seated in the battery carriage 40, the battery cases not being shown.

In order that battery lead forced out of the battery cases may be guided, there is provided a battery lead chute 134 which underlies the battery carriage 40. The chute 134 is of a U-shaped cross-section and is disposed between the various components of the base 12. The chute 134 includes an extension 136 which underlies the battery guide 62. The extension 136 is in the form of a splash or drip pan to catch acid which may remain in the battery cases. Also, there is provided a suitable guard plate 138 carried by the angle member 80 to protect the operator of the machine 10. A final protective measure is in the form of a rear wall 140 which extends the full height and length of the base 12.

Disposed at the right hand end of the base 12 is a battery case chute 142 which partially overlies a lower end of the battery lead chute 134. The battery case chute 142 is removably mounted by means of a pair of pins 144 and 146 removably received in sleeves 148 and 150 carried by the standards 24 and 26.

In the operation of the machine 10, batteries which are to have their battery leads salvaged therefrom are placed on the battery guide 62 in inverted position. After the battery carriage 40 has been lowered to its lowermost position, the batteries are slid from the battery guide 62 into the battery carriage 40. Then, the battery carriage 40 is elevated and dropped a sufficient number of times to force the battery lead out of the battery cases. While the carriage 40 is being operated, additional batteries are being positioned on the battery guide 62. As these additional batteries are slid onto the battery carriage 40, the empty battery cases will be forced out onto the battery case chute 142 where they may slide into suitable receptacles.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A battery lead salvage machine comprising a base, guide members extending upwardly from said base, a carriage carried by said guide members, said carriage having ledges for supporting batteries in inverted positions, said ledges being disposed in spaced relation to form a battery lead passageway therebetween, means carried by said base for selectively elevating and dropping said carriage to jar battery lead out of batteries mounted in said carriage, a battery lead chute underlying said carriage, a battery case chute at one end of said carriage for receiving battery cases having their battery lead removed therefrom.

2. A battery lead salvage machine comprising a base, guide members extending upwardly from said base, a carriage carried by said guide members, said carriage having ledges for supporting batteries in inverted positions, said ledges being disposed in spaced relation to form a battery lead passageway therebetween, means carried by said base for selectively elevating and dropping said carriage to jar battery lead out of batteries mounted in said carriage, said carriage including adjustable mounting means for one of said ledges for selectively spacing said ledges whereby batteries of various widths may be held by said carriage.

3. A battery lead salvage machine comprising a base, guide members extending upwardly from said base, a carriage carried by said guide members, said carriage having ledges for supporting batteries in inverted positions, said ledges being disposed in spaced relation to form a battery lead passageway therebetween, means carried by said base for selectively elevating and dropping said carriage to jar battery lead out of batteries mounted in said carriage, a battery guide carried by said base and aligned with said carriage when said carriage is in a lowered position whereby said carriage may be readily loaded.

4. A battery lead salvage machine comprising a base, guide members extending upwardly from said base, a carriage carried by said guide members, said carriage having ledges for supporting batteries in inverted positions, said ledges being disposed in spaced relation to form a battery lead passageway therebetween, means carried by said base for selectively elevating and dropping said carriage to jar battery lead out of batteries mounted in said carriage, a battery guide carried by said base and aligned with said carriage when said carriage is in a lowered position whereby said carriage may be readily loaded, said carriage including adjustable mounting means for one of said ledges for selectively spacing said ledges whereby batteries of various widths may be held by said carriage.

5. A battery lead salvage machine comprising a base, guide members extending upwardly from said base, a carriage carried by said guide members, said carriage having ledges for supporting batteries in inverted positions, said ledges being disposed in spaced relation to form a battery lead passageway therebetween, means carried by said base for selectively elevating and dropping said carriage to jar battery lead out of batteries mounted in said carriage, a battery guide carried by said base and aligned with said carriage when said carriage is in a lowered position whereby said carriage may be readily loaded, said carriage including adjustable mounting means for one of said ledges for selectively spacing said ledges whereby batteries of various widths may be held by said carriage, said battery guide being adjustable in width.

6. A battery lead salvage machine comprising a base, guide members extending upwardly from said base, a carriage carried by said guide members, said carriage having ledges for supporting batteries in inverted positions, said ledges being disposed in spaced relation to form a battery lead passageway therebetween, means carried by said base for selectively elevating and dropping said carriage to jar battery lead out of batteries mounted in said carriage, a battery lead chute underlying said carriage, a battery case chute at one end of said carriage for receiving battery cases having their battery lead removed therefrom, a battery guide carried by said base and aligned with said carriage when said carriage is in a lowered position whereby said carriage may be readily lowered, a drip pan underlying said battery guide, said drip pan forming an extension of said battery lead chute.

7. A battery lead salvage machine comprising a base, guide members extending upwardly from said base, a carriage carried by said guide members, said carriage having ledges for supporting batteries in inverted positions, said ledges being disposed in spaced relation to form a battery lead passageway therebetween, means carried by said base for selectively elevating and dropping said carriage to jar battery lead out of batteries mounted in said carriage, said means including a lift bar depending from said carriage, an endless drive member carried by said base adjacent said lift bar, lugs spaced along said drive member engageable with said lift bar to periodically lift said carriage.

References Cited in the file of this patent

UNITED STATES PATENTS

| | | |
|---|---|---|
| 697,385 | Adams | Apr. 8, 1902 |
| 1,239,909 | Hards | Sept. 11, 1917 |
| 2,119,859 | Eppensteiner | June 7, 1938 |